United States Patent [19]
Klausing

[11] Patent Number: 5,379,041
[45] Date of Patent: Jan. 3, 1995

[54] SYNTHETIC APERTURE RADAR HAVING ROTATING ANTENNAS

[75] Inventor: Helmut Klausing, Bad Aibling, Germany

[73] Assignee: Deutsche Aerospace AG, Germany

[21] Appl. No.: 131,634

[22] Filed: Oct. 5, 1993

[30] Foreign Application Priority Data

Oct. 5, 1992 [DE] Germany ................... 4233416

[51] Int. Cl.⁶ .......................................... G01S 13/90
[52] U.S. Cl. ........................... 342/25; 342/189; 342/145
[58] Field of Search .............. 342/25, 90, 145, 158, 342/189, 192, 197

[56] References Cited

U.S. PATENT DOCUMENTS

| 4,638,315 | 1/1987 | Raven | 342/5 |
| 4,737,788 | 4/1988 | Kennedy | 342/29 |
| 5,017,922 | 5/1991 | Klausing et al. | 342/25 |
| 35093,649 | 3/1992 | Johnson | 342/157 |

Primary Examiner—John B. Sotomayor
Attorney, Agent, or Firm—Evenson, McKeown, Edwards & Lenahan

[57] ABSTRACT

A rotating antenna synthetic aperture radar apparatus having a module in the processor circuit in which are stored image definition values for reducing image errors. The module acts upon process circuits to subdivide the distance range illuminated by the antenna into individual distance intervals and to determine the reference functions in these distance intervals.

10 Claims, 5 Drawing Sheets

SYNTHETIC APERTURE RADAR HAVING ROTATING ANTENNAS

BACKGROUND AND SUMMARY OF THE INVENTION

The present invention relates to the field of synthetic aperture radar (SAR), and in particular to a SAR system having a rotating antenna.

German Patent Document DE-PS 39 22 086 discloses a rotating antenna synthetic aperture radar (ROSAR Device), in which at least one antenna for transmitting and receiving radar pulses is arranged on the end of a rotating arm (for example, a helicopter rotor or a turnstile above the rotor axis). The received signals are demodulated and stored intermediately, and are then correlated with reference functions which are each calculated and preset based on the illumination geometry of the radar device.

The parameters for calculating and presetting the reference functions are the distance intervals to be measured, the transmission frequency, the length of the rotating arm: the angle of rotation range of the antenna from which the reflected signals are received; the number of transmitted pulses as well as the height of the rotating antenna above the ground. The correlation result is appropriately displayed, for example, on a monitor.

A radar device of this type may be used in approximate real time, in online operation. It thus can be used, for example, not only in the field of cartography and in obstacle warning operations, but also for the purpose of target reconnaissance and tracking. The processor of this known ROSAR-device has several modules so that the multiple and complex computing tasks may be subdivided, thereby permitting approximate real time and on-line operation.

In this known apparatus, the result for each distance interval is always obtained by correlation of the received signal with a single reference function that is valid for that distance interval.

The resolution of a ROSAR-device in the lateral and the radial direction is determined by parameters which are partially interdependent; that is, by the wavelength $\lambda$ and the length L of the rotating antenna arm, by the apex angle of the antenna $\gamma$; by the distance $R_{GO}$ between the antenna and the center line of the illuminated strip; by the height $H_o$ of the antenna above the ground: by the pulse repeating frequency $f_p$ and the duration $\tau$ of the transmitted pulses, and therefore the number $Z_s$ of the pulses for each aperture length S: by the duration of the received echo signal: by the scanning rate for the distance intervals, etc.

Strictly speaking, in order to achieve a proper image in a system such as described above, a separate reference function would have to be calculated for each object point in the radial direction, and the received signal would have to be correlated with it. The fact that existing computing capacity is not unlimited is of course sufficient reason why such a computation is impossible. Thus, in the above-mentioned Germany Patent Document DE-PS 39 22 086, the calculated reference functions are each used for one distance interval, and the reference functions are then actually only valid for object points on the center of the distance interval. The correlation of the received signal from this distance interval can therefore be achieved only with the acceptance of a phase error. Although the resulting lack of definition may be reduced by selection of correspondingly small distance intervals, such a measure would then again require increased computing capacity.

It is an object of the present invention to provide a ROSAR-device of the initially mentioned type in which image defects are minimized by simple means.

This and other objects and advantages are achieved according to the invention, in which the processor circuit is expanded by an additional module, in which the valid definition of the image is calculated. The calculated definition of the image may then be used to simplify tile computing operation. The definition of the image indicates the frequency of a new calculation of the reference functions concerning the strip width of the individual distance intervals to be imaged.

As used herein, "definition of the image" refers to that area at whose edges two objects are still imaged with sufficient clarity. This valid range may be indicated mathematically on the boundaries by the distances $R_{GO1}$ and $R_{GO2}$ at $\Delta R_{GOV} = R_{GO2} - R_{GO1}$, in which case, for this range, a maximal phase difference of $\pi/4$ is permissible, corresponding to a path difference of $\lambda/8$. This relationship may be calculated as a function of the apex angle of the antenna $\gamma$ and its height $H_0$ above the ground. Since in this case the calculation does not take place with the corresponding distance cells, the run index n is omitted: instead, the calculation takes place by means of $R_{GO1}$ and $R_{GO2}$.

The ROSAR-device according to the invention includes an additional memory module in which a calculated definition of the image is stored for different values of the parameters $\gamma$ and $H_o$ as a function of the respective distance $R_{GO1}$. Thus, on the basis of the actual circumstances (particularly the height of the antenna above the ground and the depression angle, that is, the angular field of the antenna in the direction of the ground), these stored values may then be used to read the appropriate range of the definition of the image, and to feed it to the processor circuit to subdivide the illuminated area into individual distance intervals, and thus subdivide the reference functions. The storage of the given ranges of definition of the image in this manner eliminates the need to calculate them in real time, which is particularly important because such calculation requires high expenditures.

Other objects, advantages and novel features of the present invention will become apparent from the following detailed description of the invention when considered in conjunction with the accompanying drawings.

DETAILED DESCRIPTION OF THE DRAWINGS

Figure 1:
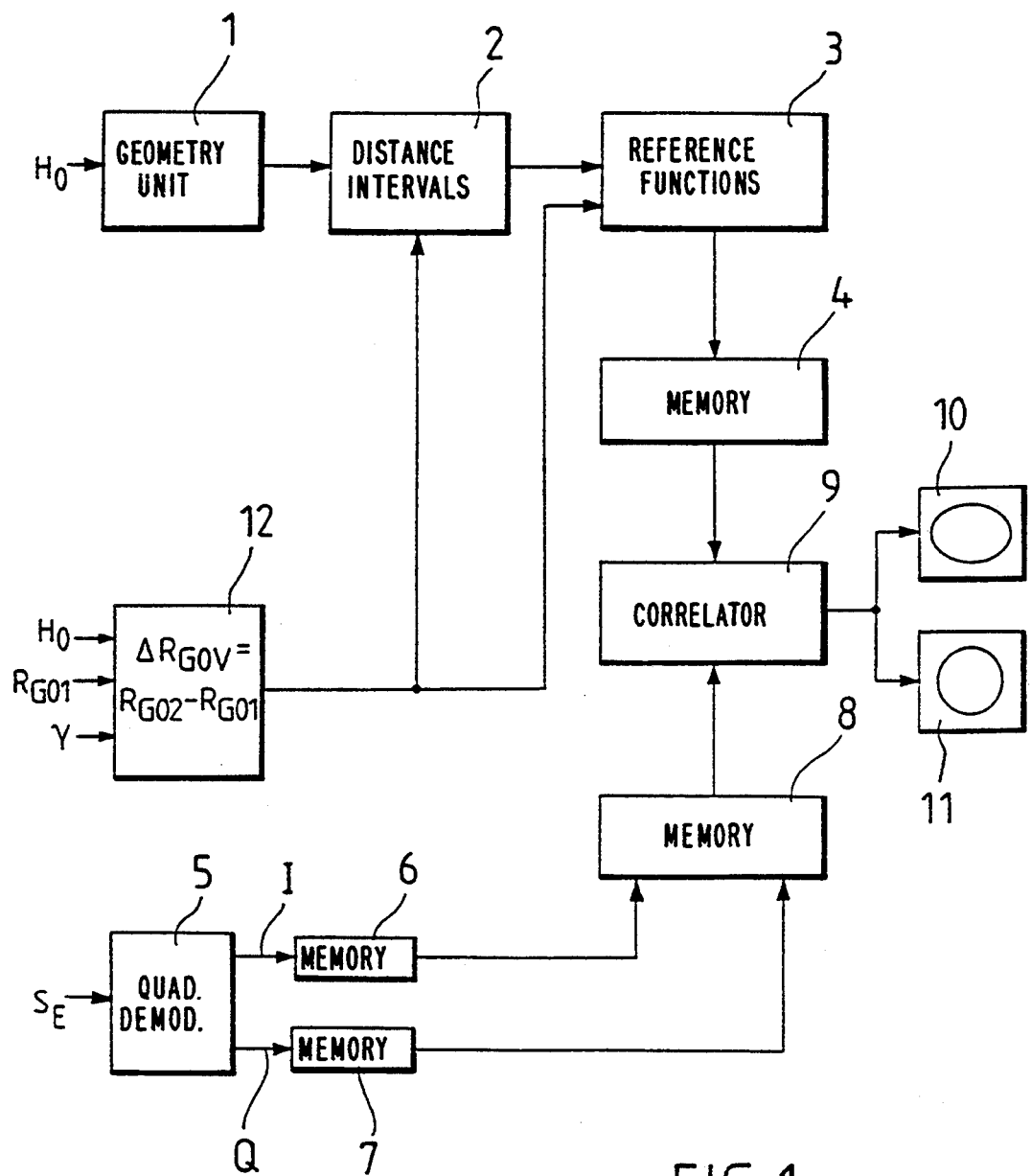
FIG. 1 is a block diagram of a processor of a ROSAR-device according to the invention.

In FIG. 1 is a schematic diagram of a processor for a ROSAR-device according to the invention. In the upper half of the block diagram, corresponding to a first channel, those modules are shown which are necessary for generating the reference functions, and, in the lower half, corresponding to a second channel, those modules are shown which are used for receiving the signals reflected from the ground.

In the first channel, a geometry component 1 is provided which, receives information concerning the height $H_0$ of the antenna above the ground and other parameters, particularly the depression angle, the pitch attitude and the length of the rotor arm, and, based on that information, calculates different magnitudes and functions. The results are fed to a processor circuit 2, which subdivides the illuminated area into individual distance intervals. This processor circuit 2 is connected with processor module 3 which calculates the reference functions for the individual distance intervals based on the output signals of the processor unit 2. The reference functions required for the correlation are then transferred into a memory 4.

In the second channel, the received signal $S_E$ is fed to a quadrature demodulator 5 and is separated into the in-phase component and the quadrature component $I_E$ and $Q_E$. The two components are entered into intermediate memories 6 and 7, and transferred to a memory 8 for the correlation. The signals which are stored in the respective memories 4 and 8 are then synchronously fed to a correlator 9 and are correlated. The correlation result is shown on a display, example, a monitor 10 and/or is fed to an analysis device 11. With respect to the detailed function, particularly concerning the distribution of the reference functions to individual distance intervals and their calculation, reference is made to the above-mentioned German Patent Document DE-PS 39 22 086.

In addition to the processor modules described above, the ROSAR apparatus according to the invention has an image definition module 12 into which several parameters are also fed; in particular, the height $H_0$ of the antenna above the ground, the respective target distance $R_{G01}$ and the apex angle of the antenna γ. Based on these parameters and additional auxiliary parameters, the image definition range $\Delta R_{G0V}$ is read from the memory and is fed to processor circuits 2 and 3. The image definition is not each time explicitly calculated in this module 12. Concerning the calculation, reference is made to the book by Dr. Ing. Helmut Klausing "Implementability of a Radar Comprising a Synthetic Aperture by Means of Rotating Antennas", MBB Publication, MBB-UA-1150-89-Pub=OTN-029299, Page 56–62.

Figure 2:
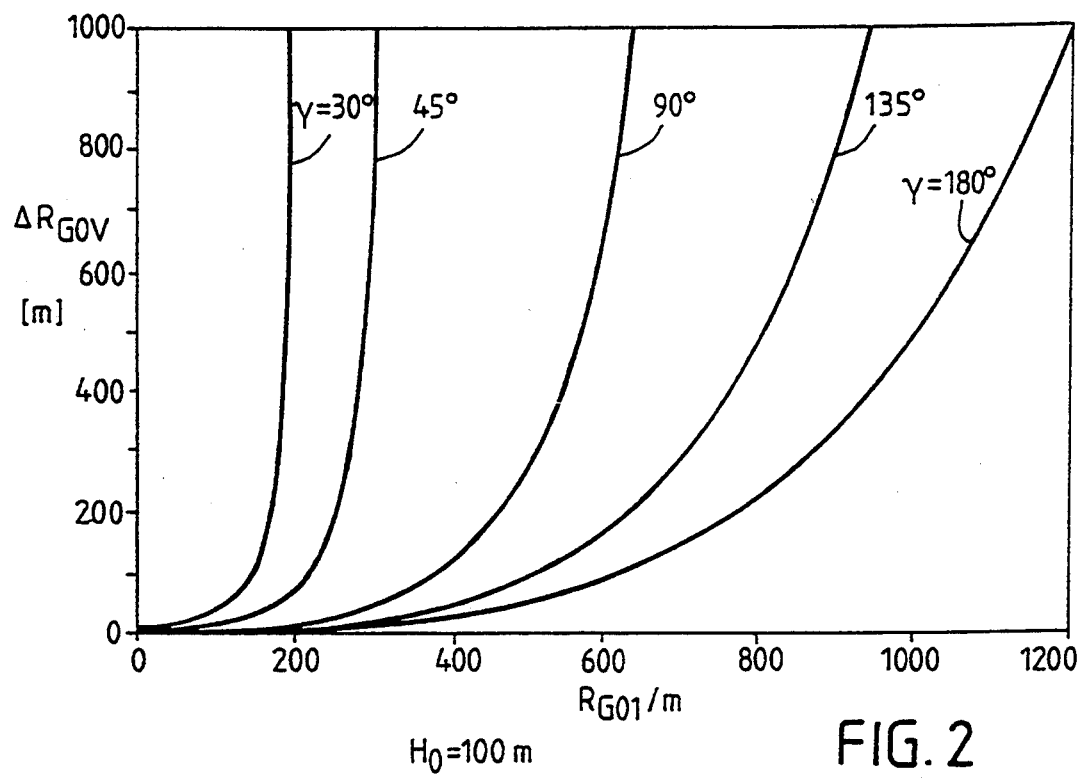
FIG. 2 is a graphic depiction of the definition of the image as a function of the distance of the object $R_{GO1}$ with the apex angle of the antenna $\gamma$ as the parameter, for a height $H_0$ of the antenna of 100 above the ground.
Figure 3:
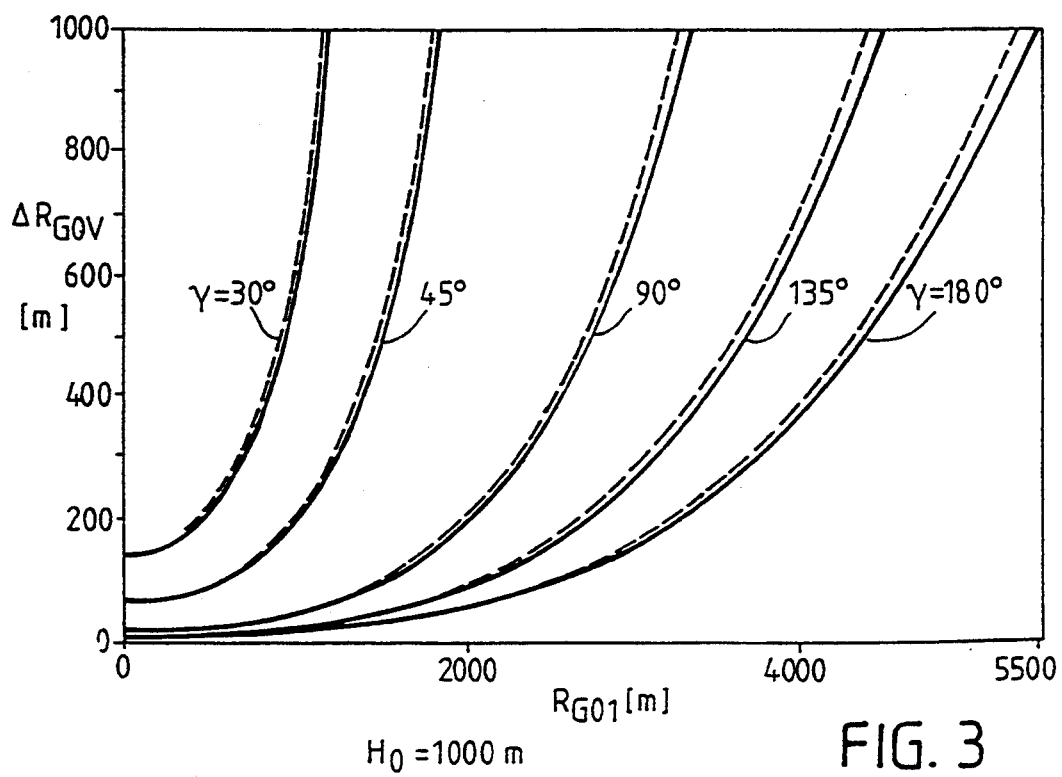
FIG. 3 depicts the definition of the image for a height $H_0$ of the antenna of 1.000 m above the ground.

FIGS. 2 and 3 illustrate the image definition for antenna altitudes $H_0$ of 100 m and 1,000 m, for different apex angles of the antenna γ in the azimuth. As illustrated, the slope of the curves increases considerably starting at a valid image definition range of approximately 1,000 m. However, because of different types of additional system errors, such as phase errors or additional statistical errors, the utilization of the whole image definition range is not meaningful. During subsequent signal processing, therefore, the influence of additional phase errors must be examined, if necessary, and the intervals of a new calculation of the reference function within the valid image definition range must be determined definitively.

The dashed curves in FIG. 3 correspond to an exact calculation of the image definition, whereas the solid lines were achieved by iterative methods of a given accuracy. The values of the image definitions for different heights $H_0$ are stored in a module 12. Because of the input data of this module 12, direct access is provided to the presently valid image definition range, and for a fixed apex angle of the antenna γ, the group of curves is a function of the height $H_0$ and the distance $R_{G01}$.

Consideration of the image definition condition may be divided essentially into two types of signal processing:

1. The valid image definition range comprises several distance intervals: In this case, the received signals from several distance intervals can be correlated by means of a single reference function. As a result, computing speed is increased considerably because a separate reference function does not have to be generated for each distance interval.

2. The valid image definition range changes within a single distance interval: As explained above, the pertaining reference function for a particular distance interval is always calculated for object points on the center line of the corresponding distance interval. Thus, correlation of the received signal has an inherent error associated therewith. In the case of the ROSAR, the image definition increases only slowly in the close range as a function of the height and the distance, and as a result, the image definition condition within a single distance interval prescribes the generation of several reference functions if the phase errors are to be kept low during the correlation.

For target reconnaissance on the ground and terrain imaging from a helicopter, to maintain a given range radial resolution on the ground $\Delta R_{Bmin}$ for a given operating altitude, a minimum distance to the object is required as a function of the depression angle. Therefore, this range of the image definition curve virtually does not occur in practice.

A different situation exists in the case of obstacle warning radar with radial radiation, in which the flying altitude is often low, and short ranges of several 100 m are desirable. Particularly in the distance range of up to 50 m or 100 m, it is absolutely necessary to recognize as obstacles, for example, wires and stretched cables which are hard to detect. In addition, in this case the image definition is lower than the depth of the distance interval, and it is therefore necessary to generate the reference function within a single distance interval several times as a function of the image definition. Correspondingly, in such cases, the module 12 will intervene in the corresponding circuit elements 2 and 3 of the processor circuit.

The newly calculated reference functions referred to above may also be used for optimal detection of small objects, such as wires and stretched cables. To this end, for a particular distance interval, several correlations are carried out between the pertaining received signal and different reference functions which are valid for that distance interval, the number of reference functions being determined by the memory module 12. As a result, several correlation figures of different resolutions are obtained depending on where an object, which is detected and imaged, is situated in the distance interval. The mean of the correlation results is then taken within the distance interval, so that small obstacles, such as wires, cables, etc. are detected in an optimal manner. Without taking the mean, by dividing a distance interval into several areas corresponding to the presetting of the memory module 12, all objects will be detected with the required resolution.

In addition to this simplified or open solution, it is advantageous also to provide a closed approach for calculating the image definition, by means of a maximally permissible angular difference $\Delta\alpha_{Diff}$ (angle error) between the maximum possible angle of rotation $\overline{\alpha}_{max}=\gamma/2$ and the actual maximum angle of rotation $$\alpha_{max} = \frac{\gamma}{2} \cdot \left(1 - \frac{L}{R_{G01}}\right) \qquad \text{[Expression 1]}$$

Using this approach, image definition can be calculated as a function of the apex angle of the antenna $\gamma$, the rotor blade length L and the distance to the object $R_{G01}$, from which the preset $\Delta\alpha_{Diff}$ is maintained. The following applies:

$$\overline{\alpha}_{max} - \alpha_{max} \leq \Delta\alpha_{Diff} \qquad \text{[Expression 2]}$$

The following will then apply to the minimum distance $R_{G0min}$ to be maintained:

$$\frac{\gamma}{2} - \frac{\gamma}{2} \cdot \left(1 - \frac{L}{R_{G0min}}\right) \leq \Delta\alpha_{Diff} \qquad \text{[Expression 3]}$$

From this inequality, the minimum Distance $R_{G0min}$ can be determined:

$$R_{G0min} = \frac{\gamma \cdot L}{2 \cdot \Delta\alpha_{Diff}} \qquad \text{[Expression 4]}$$

Starting at this distance, the closed approach can be used for the calculation of the image definition.

In the case of a given distance on the ground $R_{G01}$ and the operating attitude $H_0$, that distance $R_{G02}$ is desired which represents the boundary of the depositing area. The following applies to the maximally permissible difference of the distance at the edges of the synthetic aperture:

$$\Delta R_{2max} - \Delta R_{1max} = \frac{\lambda}{8} \qquad \text{[Expression 5]}$$

with $$\Delta R_{1max} = \qquad \text{[Expression 6]}$$

$$\sqrt{L^2 + R_{G01}^2 - 2 \cdot L \cdot R_{G01} \cdot \cos\gamma/2 + H_0^2} -$$

$$\sqrt{(R_{G01} - L)^2 + H_0^2}$$

and $$\Delta R_{2max} = \qquad \text{[Expression 7]}$$

$$\sqrt{L^2 + R_{G02}^2 - 2 \cdot L \cdot R_{G02} \cdot \cos\gamma/2 + H_0^2} -$$

$$\sqrt{(R_{G02} - L)^2 + H_0^2}$$

wherein the simplifications assumed here $$\alpha_{1max} \simeq \alpha_{2max} \simeq \alpha_{max} \simeq \frac{\gamma}{2} \qquad \text{[Expression 8]}$$

were already used.

For the further calculation, the following determinations were introduced:

$$A_1 := \sqrt{L^2 + R_{G01}^2 - 2 \cdot L \cdot R_{G01} \cdot \cos\gamma/2 + H_0^2}, \qquad \text{[Expression 9]}$$

$$B_1 := \sqrt{(R_{G01} - L)^2 + H_0^2}, \qquad \text{[Expression 10]}$$

$$2C_1 := (A_1 - B_1)^2 + \frac{\lambda}{4} \cdot (A_1 - B_1) + \frac{\lambda^2}{64} \qquad \text{[Expression 11]}$$

wherein $A_1$ is the distance between the rotor tip and an object on the ground, and $B_1$ is the distance between the rotor tip and the object on the ground at $\alpha = 0o$.

The normal form of the quadratic equation for the calculation of $R_{G02}$ will then be:

$$R_{G02}^2 + \frac{2C_1 \cdot L \cdot \left(\cos\frac{\gamma}{2} + 1\right)}{L^2 \cdot \left(\cos\frac{\gamma}{2} + 1\right)^2 - 4 \cdot L^2 \cdot \cos\frac{\gamma}{2} - 2C_1} \cdot \qquad \text{[Expression 12]}$$

$$R_{G02} + \frac{C_1^2 - 2C_1 \cdot (L^2 + H_0^2)}{L^2 \cdot \left(\cos\frac{\gamma}{2} + 1\right)^2 - 4 \cdot L^2 \cdot \cos\frac{\gamma}{2} - 2C_1} = 0.$$

With $$D := \frac{2C_1 \cdot L \cdot \left(\cos\frac{\gamma}{2} + 1\right)}{L^2 \cdot \left(\cos\frac{\gamma}{2} + 1\right)^2 - 4 \cdot L^2 \cdot \cos\frac{\gamma}{2} - 2C_1} \qquad \text{[Expression 13]}$$

and $$E := \frac{C_1^2 - 2C_1 \cdot (L^2 + H_0^2)}{L^2 \cdot \left(\cos\frac{\gamma}{2} + 1\right)^2 - 4 \cdot L^2 \cdot \cos\frac{\gamma}{2} - 2C_1} \qquad \text{[Expression 14]}$$

the solution of the quadratic equation according to $R_{G02}$ is:

$$R_{G02} = -\frac{D}{2} + \sqrt{\left(\frac{D}{2}\right)^2 - E}. \qquad \text{[Expression 15]}$$

This equation now meets the marginal physical conditions.

The permissible image definition is now calculated as follows:

$$\Delta R_{GOV} = R_{G02} - R_{G01}. \qquad \text{[Expression 16]}$$

Figure 4:
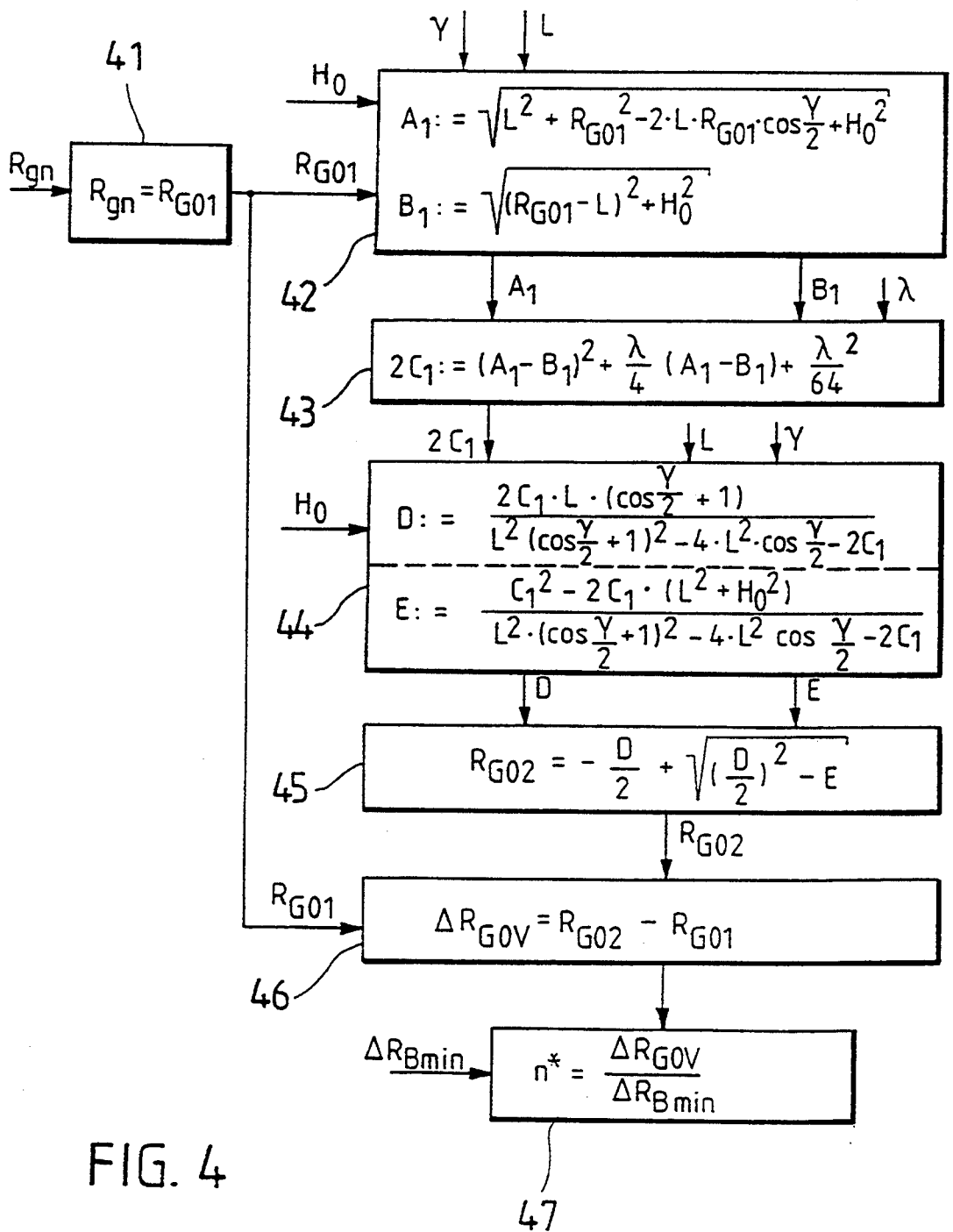
FIG. 4 is a block diagram for the closed path for the calculation of the definition of the image.

FIG. 4 illustrates the individual computing modules for the abovementioned expressions. These are: a distance module 41 for setting the distance $R_{G01}$; computing module 42 for calculating the above quantities $A_1$ and $B_1$ (Expressions 9 and 10; and an additional computing module 43 for calculating the quantity $C_1$ (Expression 11) from the quantities $A_1$ and $B_1$. In an additional computing module 44, from the quantity $C_1$, the altitude $H_o$ of the antenna above the ground; the length of the rotor blade L, and the apex angle of the antenna $\gamma$, the quantities D and E are calculated (Expressions 13 and 14), from which, in an additional module 45, the marginal condition for the image definition is determined from the calculation of $R_{G02}$. From this quantity and the quantity $R_{G01}$, the permissible image definition A $R_{GOV}$ is determined in a comparator 46, after which, in a dividing module 47, from this permissible image definition and the radial resolution $\Delta R_{Bmin}$, the number n* of the distance cells or distance intervals is determined for which the same reference function is used.

Figure 5:
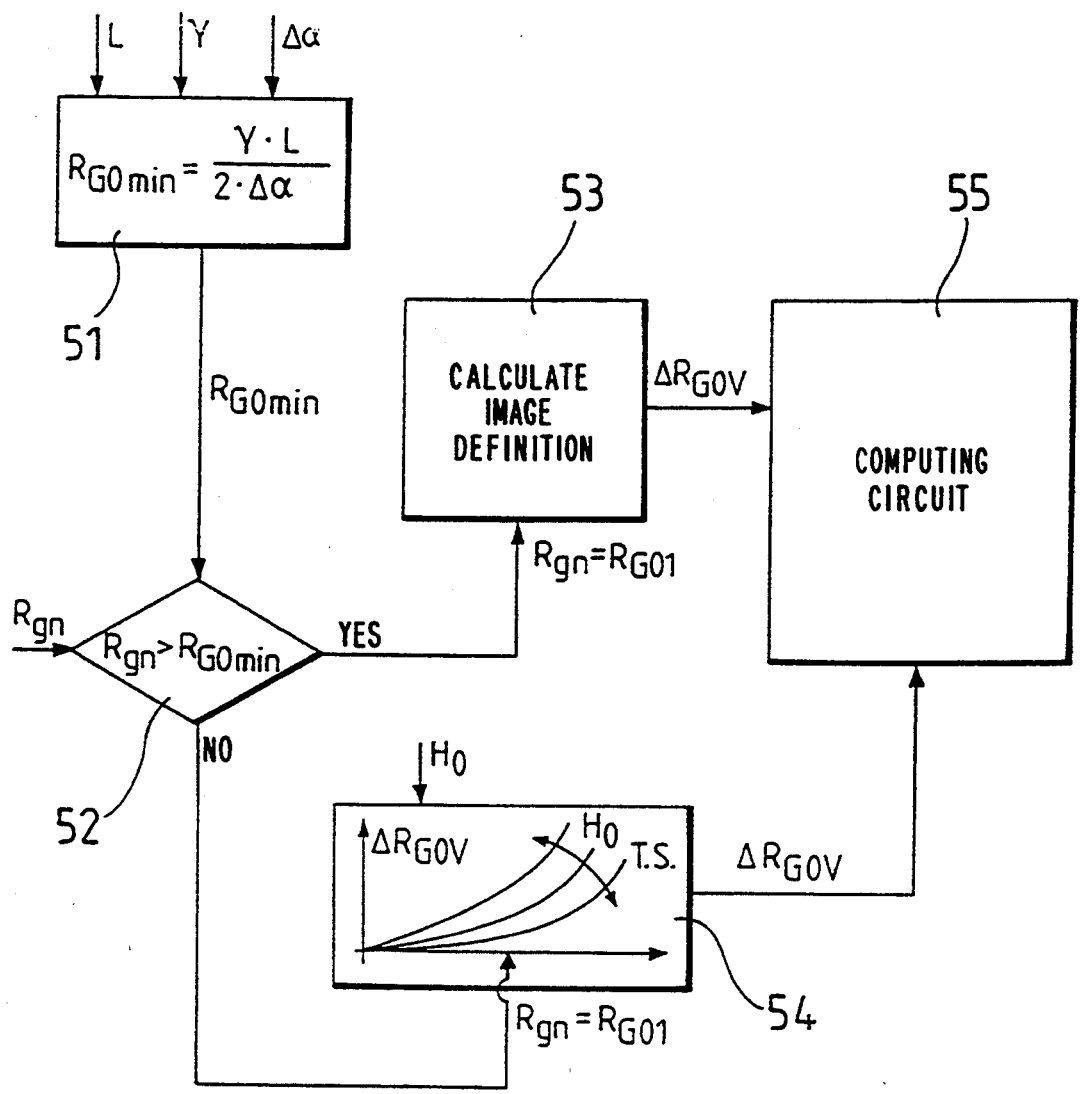
FIG. 5 illustrates a schematic diagram for taking into account the definition of the image with an open and a closed solution.

FIG. 5 is a schematic diagram for the processing of the signals with the respective correct image definition range and the corresponding reference function. In a first distance module 51, the minimum distance $R_{GOmin}$, is calculated from the values $\gamma$, L and $\alpha_{Diff}$, and the result is compared in a comparator 52 with a reference value for $R_{gn}$. If the value $R_{gn}$ is larger, calculation of image definition is performed by the closed approach in the circuit 53, according to FIG. 4. If, however, $R_{GOmin}$ is larger than $R_{gn}$, the above closed approach is used in which the respective image definition range is taken from a memory 54. According to the results of the comparison in the comparator 52, the reference function is now formed in a computing circuit corresponding to the one mentioned above.

Figure 6:
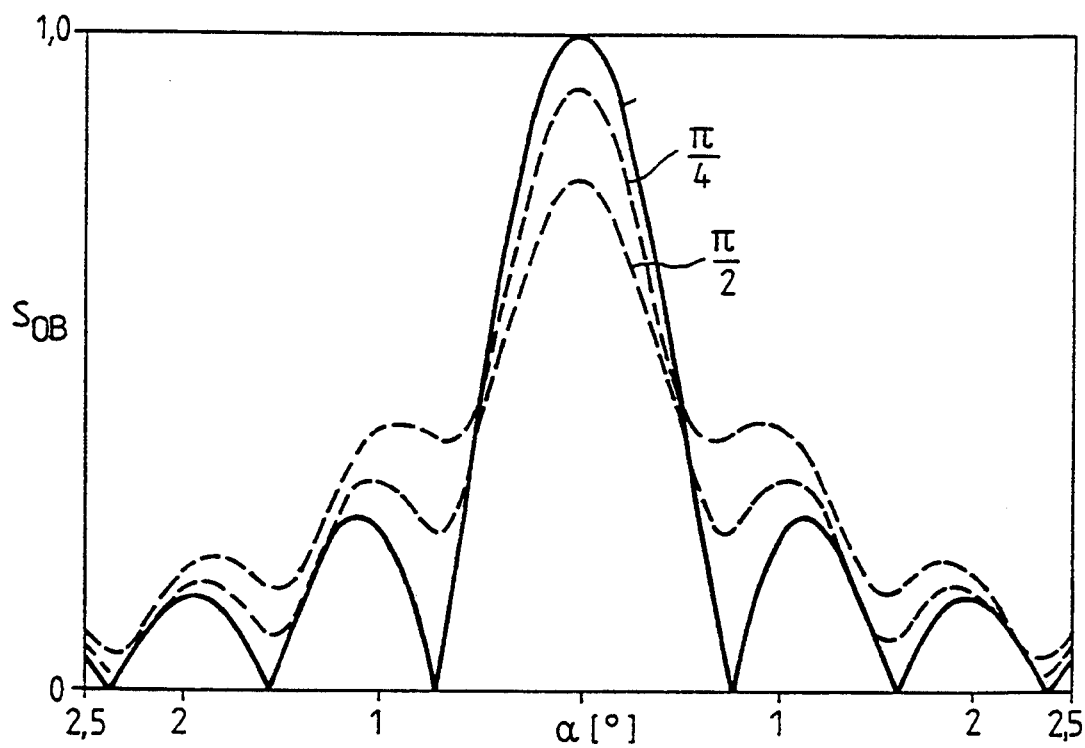
FIG. 6 is a graphic presentation of three resulting functions for an apex angle of the antenna γ of 90° for various maximal permitted phase errors.

In FIG. 6, several calculated results are illustrated at an apex angle of the antenna $\gamma$ of 90°. The solid line corresponds to the exact solution, while the two dashed curves correspond to solutions with image definition ranges in which a phase error of $\pi/4$ and $\pi/2$ was permitted. If the phase errors are to be kept lower in certain ranges, it is thus possible to switch over to the abovementioned closed approach.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A radar device comprising:
    at least one transmitter,
    at least one receiver;
    at least one antenna for transmitting and receiving radar pulses, said antenna being arranged on an end of a rotating arm;
    a device for demodulating and intermediately storing received signals;
    a first processor circuit for forming and storing reference functions based on a predetermined array of system parameters;
    a second processor circuit for subdividing a distance range illuminated by the antenna into individual distance intervals, and for determining reference functions for each such distance interval;
    a correlator for correlating the received signals with the reference functions; and
    a display device for the correction result;
    wherein the second processor circuit has a memory circuit for storing image definition data and for controlling the distance ranges for the subdivision of the distance intervals and the reference functions.

2. Radar device according to claim 1, wherein said predetermined array of system parameters comprises at least one of:
    illumination geometry of the radar device, transmitting frequency, distance intervals to be measure, angle of rotation ranges, transmitted pulses as well as the height of the rotating antenna above the ground.

3. A radar device according to claim 1, wherein said image definition data are stored in said memory circuit, as a function of height $H_O$ of the antenna above the ground as well as of an apex angle of the antenna, whereby stored values can be read out of said memory as a function of height of the antenna above the ground and of target distance at the center point of a distance range, for the calculation of reference functions.

4. A radar device according to claim 2, wherein said image definition data are stored in said memory circuit, as a function of height $H_O$ of the antenna above the ground as well as of an apex angle of the antenna, whereby stored values can be read out of said memory as a function of height of the antenna above the ground and of target distance at the center point of a distance range, for the calculation of reference functions.

5. A radar device according to claim 2, wherein when a distance range determined by a stored value of the image definition covers several distance intervals, a single reference function is used for all of said several distance intervals; and wherein when said distance range determined by a stored value is smaller than a distance interval, a plurality of reference functions are correspondingly used for this distance interval.

6. A radar device according to claim 4, wherein when a distance range determined by a stored value of the image definition covers several distance intervals, a single reference function is used for all of said several distance intervals; and wherein when said distance range determined by a stored value is smaller than a distance interval, a plurality of reference functions are correspondingly used for this distance interval.

7. A radar device according to claim 1, wherein when the distance range determined by a stored value of the image definition is smaller than a particular distance interval, within that particular distance interval the received signals are correlated with a plurality of references functions and the correlation results are considered as a mean or separately.

8. A radar device according to claim 2, wherein when the distance range determined by a stored value of the image definition is smaller than a particular distance interval, within that particular distance interval the received signals are correlated with a plurality of references functions and the correlation results are considered as a mean or separately.

9. A radar device according to claim 3, wherein when the distance range determined by a stored value of the image definition is smaller than a particular distance interval, within that particular distance interval the received signals are correlated with a plurality of references functions and the correlation results are considered as a mean or separately.

10. A radar device according to claim 4, wherein when the distance range determined by a stored value of the image definition is smaller than a particular distance interval, within that particular distance interval the received signals are correlated with a plurality of references functions and the correlation results are considered as a mean or separately.

* * * * *